United States Patent
Allain et al.

(10) Patent No.: US 9,695,054 B2
(45) Date of Patent: *Jul. 4, 2017

(54) PROCESS FOR PREPARING PRECIPITATED SILICA

(71) Applicant: RHODIA OPERATIONS, Paris (FR)

(72) Inventors: Emmanuelle Allain, L'Hay les Roses (FR); Sylvaine Neveu, Paris (FR)

(73) Assignee: Rhodia Operations, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/373,797

(22) PCT Filed: Jan. 23, 2013

(86) PCT No.: PCT/EP2013/051234
§ 371 (c)(1),
(2) Date: Jul. 22, 2014

(87) PCT Pub. No.: WO2013/110655
PCT Pub. Date: Aug. 1, 2013

(65) Prior Publication Data
US 2015/0037235 A1    Feb. 5, 2015

(30) Foreign Application Priority Data

Jan. 25, 2012 (FR) ..................... 12 00212

(51) Int. Cl.
C01B 33/12 (2006.01)
C01B 33/193 (2006.01)

(52) U.S. Cl.
CPC .......... C01B 33/128 (2013.01); C01B 33/193 (2013.01)

(58) Field of Classification Search
CPC ... C01B 33/128; C01B 33/193; C01P 2004/50
USPC ...................................... 423/339
See application file for complete search history.

(56) References Cited

U.S. PATENT DOCUMENTS

| 5,110,574 | A | 5/1992 | Reinhardt et al. |
| 5,403,570 | A | 4/1995 | Chevallier et al. |
| 5,547,502 | A | 8/1996 | Chevallier et al. |
| 5,871,867 | A | 2/1999 | Rausch et al. |
| 6,107,226 | A * | 8/2000 | Chevallier ............... 501/133 |
| 6,869,595 | B2 * | 3/2005 | Kostinko et al. ............ 424/49 |
| 2003/0118500 | A1 * | 6/2003 | Chevallier et al. ......... 423/339 |
| 2004/0062701 | A1 * | 4/2004 | Valero et al. ............... 423/339 |
| 2005/0032965 | A1 * | 2/2005 | Valero ........................ 524/493 |
| 2010/0083876 | A1 * | 4/2010 | Lahary et al. .............. 106/409 |
| 2012/0263638 | A1 | 10/2012 | Allain |
| 2013/0171051 | A1 | 7/2013 | Clouin et al. |

FOREIGN PATENT DOCUMENTS

| CN | 102137813 A | 7/2011 |
| EP | 0520862 A1 | 12/1992 |
| EP | 0754650 A1 | 1/1997 |
| JP | H05201719 A | 8/1993 |
| JP | 2004510679 A | 4/2004 |
| JP | 5727605 B2 | 4/2015 |
| WO | 0230818 A2 | 4/2002 |
| WO | 2010022544 A1 | 3/2010 |
| WO | WO 2011/026895 A1 | 3/2011 |
| WO | WO 2013/092745 A1 | 6/2013 |
| WO | WO 2013/092749 A1 | 6/2013 |
| WO | WO 2013/110654 A1 | 8/2013 |
| WO | WO 2013/110658 A1 | 8/2013 |
| WO | WO 2013/110659 A1 | 8/2013 |

OTHER PUBLICATIONS

U.S. Appl. No. 14/367,425, Clouin et al.
U.S. Appl. No. 14/367,455, Clouin et al.
U.S. Appl. No. 14/373,791, Allain et al.
U.S. Appl. No. 14/373,799, Allain et al.
U.S. Appl. No. 14/373,801, Allain.

* cited by examiner

*Primary Examiner* — Anthony J Zimmer

(57) ABSTRACT

A process for preparing precipitated silicas in which: (i) an aqueous stock with a pH of between 2 and 5 is formed; (ii) silicate and acid are simultaneously added to said stock, such that the pH of the resulting reaction medium is maintained between 2 and 5; (iii) silicate is added until a pH value of between 7 and 10 is obtained; (iv) silicate and acid are simultaneously added, such that the pH of the reaction medium is between 7 and 10; (v) acid is added until a pH value of between 2.5 and 5.3 is obtained; and (vi) the reaction medium is placed in contact with acid and silicate, such that the pH is between 2.5 and 5.3; wherein the acid used in at least one of the process steps is a concentrated acid.

11 Claims, No Drawings

PROCESS FOR PREPARING PRECIPITATED SILICA

This application is a U.S. national stage entry under 35 U.S.C. §371 of International Application No. PCT/EP2013/051234 filed Jan. 23, 2013, which claims priority to FR Application No. 12.00212 filed on Jan. 25, 2012, the whole content of this application being herein incorporated by reference for all purposes.

The present invention relates to a novel process for preparing precipitated silica.

It is known practice to use precipitated silicas as a catalyst support, as an absorbent for active materials (in particular supports for liquids, for example that are used in food, such as vitamins (especially vitamin E), choline chloride), as a viscosity enhancer, texturizer or anticaking agent, as a battery separator element, and as an additive for toothpaste or paper.

Precipitated silicas may also be used as reinforcing fillers in silicone matrices (for example for coating electric cables) or in compositions based on natural or synthetic polymer(s), in particular elastomer(s), which are especially diene-based, for example for footwear soles, floor coverings, gas barriers, fire-retardant materials and also technical components such as cable car rollers, seals for domestic electrical appliances, seals for liquid or gas pipes, braking system seals, sheathings, cables and transmission belts.

It is thus known practice to prepare, by performing a precipitation reaction between a silicate and a dilute acid, precipitated silicas that may be used as reinforcing fillers for polymer compositions, which have atypical characteristics.

The aim of the present invention is to propose a novel process for preparing precipitated silica, which constitutes an alternative to the known processes for preparing precipitated silica.

More preferably, one of the aims of the present invention consists in providing a process which, while having an improved productivity, in particular as regards the precipitation reaction, especially in comparison with the preparation processes of the state of the art using, as acid, a dilute acid, makes it possible to obtain precipitated silicas having similar physicochemical characteristics and properties, especially as regards their morphology, their particle size and their porosity and/or their reinforcing properties, to those of the precipitated silicas obtained by these preparation processes of the state of the art.

Another aim of the invention preferentially consists, at the same time, in reducing the amount of energy consumed and/or the amount of water used during the preparation of precipitated silica, in particular in comparison with the processes of the prior art using, as acid, a dilute acid.

With these aims in particular, the subject of the invention is a novel process for preparing precipitated silica, comprising the reaction of a silicate with at least one acid, whereby a silica suspension is obtained, and then in separating and drying this suspension, in which the reaction of the silicate with the acid is performed according to the following successive steps:

(i) an aqueous stock with a pH of between 2 and 5, preferably between 2.5 and 5, is formed,
(ii) silicate and acid are simultaneously added to said stock, such that the pH of the reaction medium is maintained between 2 and 5, preferably between 2.5 and 5,
(iii) the addition of the acid is stopped while continuing the addition of silicate to the reaction medium until a pH value in the reaction medium of between 7 and 10, preferably between 7.5 and 9.5, is obtained,
(iv) silicate and acid are simultaneously added to the reaction medium, such that the pH of the reaction medium is maintained between 7 and 10, preferably between 7.5 and 9.5,
(v) the addition of the silicate is stopped while continuing the addition of the acid to the reaction medium until a pH value in the reaction medium of between 2.5 and 5.3, preferably between 2.8 and 5.2, is obtained,
(vi) the reaction medium obtained after step (v) (thus having a pH of between 2.5 and 5.3, preferably between 2.8 and 5.2) is placed in contact (mixture) with acid and silicate, such that the pH of the reaction medium is maintained between 2.5 and 5.3, preferably between 2.8 and 5.2, in which process:
in at least one part of step (ii) (i.e., in, at the minimum, part or all of step (ii)) and/or
in step (vi)
the acid used is a concentrated acid, preferably chosen from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight, hydrochloric acid with a concentration of at least 30% by weight.

Advantageously, the concentrated acid is concentrated sulfuric acid, i.e., sulfuric acid with a concentration of at least 80% by weight, preferably of at least 90% by weight.

Sulfuric acid with a concentration of at least 1400 g/l, in particular of at least 1650 g/l may thus be used as concentrated acid.

It is possible, in an optional subsequent step (vii), to add, to the reaction medium obtained after step (vi), an alkaline agent, preferably a silicate, this being done until a pH value of the reaction medium of between 4.7 and 6.3, preferably between 5.0 and 5.8, for example between 5.0 and 5.4, is reached.

According to a variant (A) of the process of the invention, the acid used in step (vi) is a concentrated acid as defined above.

The acid used in steps (ii), (iv) and (v) may then be a dilute acid, advantageously dilute sulfuric acid, i.e., having a concentration very much less than 80% by weight, in this instance a concentration of less than 20% by weight (and in general of at least 4% by weight), in particular of less than 14% by weight, especially of at most 10% by weight, for example between 5% and 10% by weight.

According to a preferred variant of the invention (variant (B)), the invention is a novel process for preparing precipitated silica, comprising the reaction of a silicate with at least one acid, whereby a silica suspension is obtained, followed by the separation and drying of this suspension, in which the reaction of the silicate with the acid is performed according to the following successive steps:

(i) an aqueous stock with a pH of between 2 and 5, preferably between 2.5 and 5 is formed,
(ii) silicate and acid are simultaneously added to said stock, such that the pH of the reaction medium is maintained between 2 and 5, preferably between 2.5 and 5,
(iii) the addition of the acid is stopped while continuing the addition of silicate to the reaction medium until a pH value in the reaction medium of between 7 and 10, preferably between 7.5 and 9.5, is obtained, (iv) silicate and acid are simultaneously added to the reaction medium, such that the pH of the reaction medium is maintained between 7 and 10 and preferably between 7.5 and 9.5, (v) the addition of the silicate is stopped while continuing the addition of the acid to the reaction medium until a pH value in the reaction medium of between 2.5 and 5.3, preferably between 2.8 and 5.2, is obtained, (vi) the reaction medium obtained after step (v) (thus having a pH of between 2.5 and 5.3, preferably between 2.8 and 5.2) is placed in contact (mixture) with acid and silicate, such that the pH of the reaction medium is maintained between 2.5 and 5.3, preferably between 2.8 and 5.2, in which process, in at least one part of step (ii) (i.e., in, at the minimum, part or all of step (ii)), the acid used is a concentrated acid, preferably chosen from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight, hydrochloric acid with a concentration of at least 30% by weight.

According to one of the essential characteristics of variant (B), taken in combination with a succession of particular steps, and in particular the presence of a first simultaneous addition of acid and silicate in an acidic medium at a pH of between 2 and 5 and of a second simultaneous addition of acid and silicate in basic medium at a pH of between 7 and 10, the acid used in at least part of step (ii) is a concentrated acid, preferably chosen from the group consisting of sulfuric acid with a concentration of at least 80% by weight, in particular at least 90% by weight, acetic acid or formic acid with a concentration of at least 90% by weight, nitric acid with a concentration of at least 60% by weight, phosphoric acid with a concentration of at least 75% by weight or hydrochloric acid with a concentration of at least 30% by weight.

Advantageously, the concentrated acid is concentrated sulfuric acid, i.e., sulfuric acid with a concentration of at least 80% by weight (and in general of at most 98% by weight) and preferably of at least 90% by weight; in particular, its concentration is between 90% and 98% by weight, for example between 91% and 97% by weight.

According to one embodiment of variant (B), the concentrated acid as defined above is used only in a part of step (ii).

The acid used in steps (iv) to (vi) may then be, for example, a dilute acid, advantageously dilute sulfuric acid, i.e., having a concentration very much less than 80% by weight, in this instance a concentration of less than 20% by weight (and in general of at least 4% by weight), in particular of less than 14% by weight, especially of at most 10% by weight, for example between 5% and 10% by weight.

Preferably, the acid used in step (iv) is also a concentrated acid as mentioned above.

Most preferably, the acid used in steps (iv) and (v) is also a concentrated acid as mentioned above.

However, according to a preferred embodiment of variant (B), the acid used in steps (iv) to (vi) is also a concentrated acid as mentioned above.

In the context of this preferred embodiment of variant (B), the concentrated acid used in a part of step (ii) is used in general in a second and final part of this step (ii) (the acid used in the other part of step (ii) being, for example, a dilute acid as described above). Thus, in this step (ii), the acid used until the gel point is reached in the reaction medium (corresponding to a sudden increase in the turbidity of the reaction medium characteristic of an increase in the size of the objects) may be a dilute acid as mentioned above, advantageously dilute sulfuric acid (i.e., with a concentration very much less than 80% by weight, in this instance a concentration of less than 20% by weight, in general less than 14% by weight, in particular of at most 10% by weight, for example between 5% and 10% by weight). The acid used after reaching the gel point in the reaction medium may be, for its part, a concentrated acid as mentioned above, advantageously concentrated sulfuric acid, i.e., sulfuric acid with a concentration of at least 80% by weight, preferably of at least 90% by weight, in particular of between 90% and 98% by weight.

Similarly, in this step (ii), the acid used in the first x minutes of step (ii), with x being between 10 and 25, preferably between 12 and 22, may be a dilute acid as mentioned above and the acid used after the first x minutes of step (ii), with x being between 10 and 25, preferably between 12 and 22, may be a concentrated acid as mentioned above.

In the context of this preferred embodiment of variant (B), the acid used in the entirety of step (ii) may also be a concentrated acid as mentioned above, advantageously concentrated sulfuric acid, i.e., having a concentration of at least 80% by weight, preferably of at least 90% by weight, in particular of between 90% and 98% by weight. In this case, water may optionally be added to the initial stock, in particular either before step (ii) or during step (ii).

In the process according to the invention, an organic acid such as acetic acid, formic acid or carbonic acid or, preferably, a mineral acid such as sulfuric acid, nitric acid, phosphoric acid or hydrochloric acid is generally used as acid(s) (concentrated acid or dilute acid).

If use is made, as concentrated acid, of concentrated acetic acid or concentrated formic acid, then their concentration is at least 90% by weight.

If use is made, as concentrated acid, of concentrated nitric acid, then its concentration is at least 60% by weight.

If use is made, as concentrated acid, of concentrated phosphoric acid, then its concentration is at least 75% by weight.

If use is made, as concentrated acid, of concentrated hydrochloric acid, then its concentration is at least 30% by weight.

However, very advantageously, use is made, as acid(s), of sulfuric acid(s), the concentrated sulfuric acid then used having a concentration as already mentioned thereabove.

In general, when concentrated acid is used in several steps, the same concentrated acid is then used.

Use may furthermore be made, as silicate, of any common form of silicates, such as metasilicates, disilicates and advantageously an alkali metal silicate, in particular sodium or potassium silicate.

The silicate may have a concentration (expressed as $SiO_2$) of between 40 and 330 g/l, for example between 60 and 300 g/l, in particular between 60 and 260 g/l.

In general, sodium silicate is used as silicate.

In the case where use is made of sodium silicate, the latter generally has an $SiO_2/Na_2O$ weight ratio of between 2.5 and 4, for example between 3.2 and 3.8.

The alkaline agent used during the optional step (vii) may be, for example, a sodium hydroxide, potassium hydroxide or ammonia solution. Preferably, this alkaline agent is silicate, in particular silicate as used in the preceding steps.

As more particularly regards the preparation process of the invention, the reaction of the silicate with the acid takes place in a very specific manner according to the following steps.

An aqueous stock with a pH of between 2 and 5 is first formed (step (i)). Preferably, the stock formed has a pH of between 2.5 and 5, especially between 3 and 4.6; this pH is, for example, between 3.5 and 4.5.

This initial stock may be obtained (preferred variant) by adding acid to water so as to obtain a pH value in the stock of between 2 and 5, preferably between 2.5 and 5, especially between 3 and 4.6, for example between 3.5 and 4.5.

It may also be obtained by adding acid to a water+silicate mixture so as to obtain this pH value.

It may also be prepared by adding acid to a stock containing preformed silica particles at a pH below 7, so as to obtain a pH value of between 2 and 5, preferably between 2.5 and 5, especially between 3 and 4.6, for example between 3.5 and 4.5.

The stock formed in step (i) may optionally comprise an electrolyte.

The term "electrolyte" is understood here in its generally accepted sense, i.e., it means any ionic or molecular substance which, when in solution, decomposes or dissociates to form ions or charged particles. Electrolytes that may be mentioned include a salt of the group of alkali metal and alkaline-earth metal salts, especially the salt of the starting silicate metal and of the acid, for example sodium chloride in the case of the reaction of a sodium silicate with hydrochloric acid, or, preferably, sodium sulfate in the case of the reaction of a sodium silicate with sulfuric acid.

Preferably, when sodium sulfate is used as electrolyte in step (i), its concentration in the initial stock is in particular between 12 and 20 g/l, for example between 13 and 18 g/l.

The second step (step (ii)) consists of a simultaneous addition of acid and silicate, such that (in particular at rates such that) the pH of the reaction medium is between 2 and 5, preferably between 2.5 and 5, especially between 3 and 5, for example between 3.5 and 4.8.

In general, this simultaneous addition is performed such that the pH value of the reaction medium is close to, preferably constantly equal (to within ±0.2) to, that reached after the initial step (i).

Next, in a step (iii), the addition of the acid is stopped while continuing the addition of silicate to the reaction medium so as to obtain a pH value in the reaction medium of between 7 and 10, preferably between 7.5 and 9.5, for example between 7.5 and 9.

Maturation of the reaction medium, especially at the pH obtained after step (iii), and in general with stirring, may optionally be performed just after this step (iii), and thus just after stopping the addition of silicate; this maturation may last, for example, from 2 to 45 minutes, in particular from 5 to 25 minutes, and preferentially does not comprise any addition of acid or addition of silicate.

After step (iii) and the optional maturation, a new simultaneous addition of acid and silicate is performed, such that (in particular at rates such that) the pH of the reaction medium is maintained between 7 and 10, preferably between 7.5 and 9.5, for example between 7.5 and 9 (step (iv)).

In general, this second simultaneous addition is performed such that the pH value of the reaction medium is constantly equal (to within ±0.2) to that reached after the preceding step.

It should be noted that it is possible, between step (iii) and step (iv), for example between, on the one hand, the optional maturation following step (iii), and, on the other hand, step (iv), to add to the reaction medium acid, preferably concentrated acid as defined above, the pH of the reaction medium obtained from this addition of acid being, however, between 7 and 9.5, preferably between 7.5 and 9.5, for example between 7.5 and 9.

Next, in a step (v), the addition of the silicate is stopped while continuing the addition of acid to the reaction medium so as to obtain a pH value in the reaction medium of between 2.5 and 5.3, preferably between 2.8 and 5.2, for example between 3.5 and 5.1 (or even between 3.5 and 5.0).

It is optionally possible to perform, just after this step (v), maturation of the reaction medium, especially at the pH obtained after step (v), and in general with stirring; this maturation may last, for example, from 2 to 45 minutes, in particular from 5 to 20 minutes, and preferentially does not comprise any addition of acidifying agent or addition of silicate.

Next, the following are placed in contact (step (vi)):
the reaction medium obtained after step (v), said reaction medium having a pH of between 2.5 and 5.3, preferably between 2.8 and 5.2, for example between 3.5 and 5.1 (or even between 3.5 and 5.0),
with acid and silicate,
such that (in particular at rates such that) the pH of the reaction medium obtained is maintained between 2.5 and 5.3, preferably between 2.8 and 5.2, for example between 3.5 and 5.1 (or even between 3.5 and 5.0).

Said pH of the reaction medium may vary within the range 2.5-5.3, preferably the range 2.8-5.2, for example the range 3.5-5.1 (or even 3.5-5.0), or preferably remain (substantially) constant within these ranges.

In general, in this step (vi), the placing in contact of the reaction medium obtained from step (v) with the acid and the silicate is performed by adding acid and silicate to said reaction medium.

According to a variant of the process of the invention, in step (vi), the acid is first added to said reaction medium, followed by the silicate.

However, according to a preferred variant of the process of the invention, in step (vi), the acid and the silicate are instead added simultaneously to said reaction medium; preferably, this simultaneous addition is performed with regulation of the pH of the reaction medium obtained during this addition at a (substantially) constant value within the abovementioned ranges.

Step (vi) is generally performed with stirring.

The optional step (vii) of the process according to the invention consists in adding, to the reaction medium obtained after step (vi), an alkaline agent, preferably silicate, this being done until a pH value of the reaction medium of between 4.7 and 6.3, preferably between 5.0 and 5.8, for example between 5.0 and 5.4, is reached. This step (vii) is usually performed with stirring.

In general, all of the reaction (steps (i) to (vi), or (vii) where appropriate) are performed with stirring.

Steps (i) to (vi), or (vii) where appropriate, are all usually performed between 75 and 97° C., preferably between 80 and 96° C.

According to one variant of the process of the invention, all of the steps are performed at a constant temperature.

According to another variant of the process of the invention, the temperature at the end of the reaction is higher than the temperature at the start of the reaction: thus, the temperature at the start of the reaction (for example during steps (i) and (ii)) is preferably maintained at between 75 and 90° C. and the temperature is then increased, preferably up to a value of between 90 and 97° C., at which value it is maintained (for example during steps (iii) to (vii)), up to the end of the reaction.

It may be advantageous, on conclusion of step (vi), or of the optional step (vii), to perform maturation of the reaction medium obtained, especially at the pH obtained on conclusion of this step (vi) (or of step (vii)), and generally with stirring. This maturation may last, for example, from 2 to 30 minutes, in particular from 3 to 20 minutes, and may be performed between 75 and 97° C., preferably between 80 and 96° C., in particular at the temperature at which step (vii) (or step (vii)) has been performed. It preferably comprises neither addition of acid nor addition of silicate.

In the process according to the invention, step (vi) may be performed in a rapid mixer or in a region of turbulent flow, which can permit better control of the characteristics of the precipitated silicas obtained.

For example, in the case where, in step (vi), first the acid and then the silicate are added to the reaction medium obtained after step (v), then said silicate can be placed in contact with the medium resulting from the addition of the acid to the reaction medium obtained from step (v) in a rapid mixer or in a region of turbulent flow.

Similarly, in the case where, in step (vi), the acid and the silicate are added simultaneously to the reaction medium obtained from step (v), then said acid and said silicate may be placed in contact with said reaction medium in a rapid mixer or in a region of turbulent flow.

Preferably, the reaction medium obtained in the rapid mixer or in a region of turbulent flow feeds a reactor, preferably subjected to stirring, in which reactor the optional step (vii) is performed.

In step (vi), use may be made of a rapid mixer selected from symmetrical T-shaped or Y-shaped mixers (or tubes), asymmetrical T-shaped or Y-shaped mixers (or tubes), tangential jet mixers, Hartridge-Roughton mixers, vortex mixers or rotor-stator mixers.

Symmetrical T-shaped or Y-shaped mixers (or tubes) generally consist of two opposing tubes (T-shaped tubes) or two tubes forming an angle of less than 180° (Y-shaped tubes), of the same diameter, discharging into a central tube, the diameter of which is identical to or greater than that of the two preceding tubes. They are said to be "symmetrical" because the two tubes for injecting the reactants exhibit the same diameter and the same angle with respect to the central tube, the device being characterized by an axis of symmetry. Preferably, the central tube exhibits a diameter two times greater approximately than the diameter of the opposing tubes; likewise, the fluid velocity in the central tube is preferably equal to half that in the opposing tubes.

However, it is preferable to use, in particular when the two fluids to be introduced do not have the same flow rate, an asymmetrical T-shaped or Y-shaped mixer (or tube) rather than a symmetrical T-shaped or Y-shaped mixer (or tube). In the asymmetrical devices, one of the fluids (generally the fluid with the lower flow rate) is injected into the central tube by means of a side tube of smaller diameter. The latter forms an angle generally of 90° with the central tube (T-shaped tube); this angle may be other than 90° (Y-shaped tube), giving cocurrent systems (for example an angle of 45°) or countercurrent systems (for example an angle of 135°), relative to the other current.

Use is preferably made, as rapid mixer, of a tangential jet mixer, a Hartridge-Roughton mixer or a vortex mixer (or precipitator), which derive from symmetrical T-shaped devices.

More particularly, in step (vi), use may be made of a tangential jet, Hartridge-Roughton or vortex rapid mixer comprising a chamber having (a) at least two tangential admissions via which either, on the one hand, the silicate and, on the other hand, the medium resulting from the addition of acid to the reaction medium obtained from step (v) or, on the one hand, the silicate and the acid and, on the other hand, the reaction medium obtained from step (v) enter separately (but at the same time), and (b) an axial outlet via which the reaction medium obtained in this step (vi) exits, preferably toward a reactor (vessel) arranged in series after said mixer. The two tangential admissions are preferably situated symmetrically and in opposing fashion with respect to the central axis of said chamber.

The chamber of the tangential jet, Hartridge-Roughton or vortex mixer optionally used generally has a circular cross section and is preferably cylindrical in shape.

Each tangential admission tube may have an internal diameter d from 0.5 to 80 mm.

This internal diameter d may be between 0.5 and 10 mm, in particular between 1 and 9 mm, for example between 2 and 7 mm. However, in particular on the industrial scale, it is preferably between 10 and 80 mm, in particular between 20 and 60 mm, for example between 30 and 50 mm.

The internal diameter of the chamber of the tangential jet, Hartridge-Roughton or vortex mixer optionally used may be between 3 d and 6 d, in particular between 3 d and 5 d, for example equal to 4 d; the internal diameter of the axial outlet tube may be between 1 d and 3 d, in particular between 1.5 d and 2.5 d, for example equal to 2 d.

The silicate and acid flow rates are, for example, determined so that, at the point of confluence, the two streams of reactants come into contact with one another in a region of sufficiently turbulent flow.

In the process according to the invention, on conclusion of step (vi) (or of step (vii) where appropriate), optionally followed by maturation, a silica slurry is obtained and is subsequently separated (liquid/solid separation).

The separation performed in the preparation process according to the invention usually comprises a filtration, followed by washing, if necessary. The filtration is performed according to any suitable method, for example by means of a filter press, a band filter, a filter under vacuum.

The silica suspension thus recovered (filter cake) is then dried.

This drying may be performed according to any means known per se.

Preferably, the drying is performed by atomization. To this end, use may be made of any type of suitable atomizer, in particular a rotary, nozzle, liquid pressure or two-fluid atomizer. In general, when the filtration is performed using a filter press, a nozzle atomizer is used and, when the filtration is performed using a vacuum filter, a rotary atomizer is used.

It should be noted that the filter cake is not always under conditions enabling atomization, especially on account of its high viscosity. In a manner known per se, the cake is then subjected to disintegration. This operation may be performed mechanically, by treating the cake in a mill of colloidal or ball type. The disintegration is generally performed in the presence of water and/or in the presence of an aluminum compound, in particular of sodium aluminate, and optionally in the presence of an acid as described previously (in the latter case, the aluminum compound and the acid are generally added simultaneously). The disintegration makes it possible especially to lower the viscosity of the suspension to be subsequently dried.

When the drying is performed using a nozzle atomizer, the silica capable of being then obtained is usually in the form of substantially spherical beads.

On conclusion of the drying operation, a milling step may then be performed on the recovered product. The silica capable of being then obtained is generally in the form of a powder.

When the drying is performed using a rotary atomizer, the silica capable of being then obtained may be in the form of a powder.

Finally, the product, dried (in particular by a rotary atomizer) or milled as indicated above may optionally be subjected to an agglomeration step, which consists, for example, of direct compression, wet granulation (i.e., with use of a binder, such as water, silica suspension, etc.), extrusion or, preferably, dry compacting. When the latter technique is used, it may prove to be opportune, before performing the compacting, to deaerate (operation also referred to as predensifying or degassing) the pulverulent products so as to remove the air included therein and to ensure more uniform compacting.

The silica capable of being then obtained via this agglomeration step is generally in the form of granules.

The silica powders, and similarly the silica beads, obtained via the process according to the invention thus offer the advantage, inter alia, of providing access, in a simple, effective, economical way, to granules, especially by conventional shaping operations, for instance granulation or compacting, without the latter causing damage capable of obscuring, indeed even destroying, the good properties intrinsically attached to these powders or these beads.

Generally, the process according to the invention makes it possible to obtain silicas formed of aggregates of large primary silica particles, at the surface of which occur small primary silica particles, advantageously exhibiting the characteristics of the silicas described in the international application WO 2011/026895.

The implementation of the preparation process according to the invention, particularly when the concentrated acid used is concentrated sulfuric acid, makes it possible in particular to obtain during said process (after step (vi) or the optional step (vii)) a suspension that is more concentrated in silica than that obtained via an identical process using only dilute acid, and thus a gain in silica productivity (which may be, for example, up to at least 10% to 40%), while at the same time being accompanied, surprisingly, by the production of precipitated silicas preferably having a particular morphology, particle size distribution and porosity. Generally, the precipitated silicas obtained via the process according to the invention exhibit a good ability to disperse in polymers and give the latter a very satisfactory compromise of properties, for example in their mechanical, dynamic and rheological properties, comparable to those of the precipitated silicas obtained via an identical process using only dilute acid.

Advantageously, at the same time, especially when the concentrated acid used is concentrated sulfuric acid, the process according to the invention enables, relative to an identical process using only dilute acid, a saving (which may reach for example at least 15% to 60%) in the energy consumption (in the form of live steam for example), in particular in the precipitation reaction (i.e., at the end of step (vi)), due to a reduction in the amounts of water involved and the exothermicity linked to the use of concentrated acid. In addition, the use of concentrated acid makes it possible to restrict (for example by at least 15%) the amount of water required for the reaction, especially due to the reduction in the amount of water used for the preparation of the acid.

The precipitated silicas prepared via the process according to the invention may be used in many applications.

They may be used especially as catalyst support, as absorbent for active materials (in particular support for liquids, for example used in food, such as vitamins (vitamin E) or choline chloride), in polymer compositions, especially elastomer or silicone compositions, as viscosity enhancer, texturizer or anticaking agent, as battery separator component, as additive for toothpaste, for concrete, for paper.

However, they find a particularly advantageous application in the reinforcement of natural or synthetic polymers.

The polymer compositions in which they may be used, especially as reinforcing filler, are generally based on one or more polymers or copolymers, in particular on one or more elastomers, especially thermoplastic elastomers, which preferably have at least one glass transition temperature between −150 and +300° C., for example between −150 and +20° C.

As possible polymers, mention may be made of diene polymers, in particular diene elastomers.

Mention may be made, as non-limiting examples of finished articles based on the polymer compositions described above, of footwear soles, tires, floor coverings, gas barriers, fire-retardant materials and also engineering components, such as cableway rollers, seals for domestic electrical appliances, seals for liquid or gas pipes, braking system seals, sheathings (especially cable sheathings), cables and transmission belts.

The invention claimed is:

1. A process for preparing precipitated silica, the process comprising:
   reacting a silicate with at least one acid using the following steps, whereby a silica suspension is obtained:
   (i) forming an aqueous stock with a pH of between 2 and 5,
   (ii) simultaneously adding a silicate and an acid to said stock to form a reaction mixture, such that the pH of the reaction medium is maintained between 2 and 5,
   (iii) stopping the addition of the acid used in step (ii) while continuing the addition of a silicate to the reaction medium until a pH value in the reaction medium of between 7 and 10 is obtained,
   (iv) simultaneously adding a silicate and an acid to the reaction medium, such that the pH of the reaction medium is maintained between 7 and 10,
   (v) stopping the addition of the silicate used in step (iv) while continuing the addition of an acid to the reaction medium until a pH value in the reaction medium of between 2.5 and 5.3 is obtained, and
   (vi) placing the reaction medium in contact with an acid and a silicate, such that the pH of the reaction medium is maintained between 2.5 and 5.3;
   separating precipitate from the silica suspension; and
   drying the precipitate,
wherein step (ii) comprises adding, for x minutes, a dilute acid followed by adding, after x minutes, a concentrated acid, where x is between 10 and 25, and wherein the acid used in step (iv) is a concentrated acid, wherein the concentrated acid, independently in each of steps (ii) and (iv), is selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

2. The process according to claim 1, wherein, after the reaction medium is placed in contact with said acid and said silicate used in step (vi), an alkaline agent is added to the obtained reaction medium, so as to increase the pH of the reaction medium up to a value of between 4.7 and 6.3.

3. A process for preparing precipitated silica, the process comprising:

reacting a silicate with at least one acid the following steps, whereby a silica suspension is obtained:
  (i) forming an aqueous stock with a pH of between 2 and 5,
  (ii) simultaneously adding a silicate and an acid to said aqueous stock to form a reaction medium, such that the pH of the reaction medium is maintained between 2 and 5,
  (iii) stopping the addition of the acid used in step (ii) while continuing the addition of a silicate to the reaction medium until a pH value in the reaction medium of between 7 and 10 is obtained,
  (iv) simultaneously adding a silicate and an acid to the reaction medium, such that the pH of the reaction medium is maintained between 7 and 10,
  (v) stopping the addition of the silicate used in step (iv) while continuing the addition of an acid to the reaction medium until a pH value in the reaction medium of between 2.5 and 5.3 is obtained, and
  (vi) placing the reaction medium in contact with an acid and a silicate, such that the pH of the reaction medium is maintained between 2.5 and 5.3;

separating precipitate from the silica suspension; and
drying the precipitate, wherein step (ii) comprises adding, for x minutes, a dilute acid followed by adding, after x minutes, a concentrated acid, where x is between 10 and 25, wherein the concentrated acid is selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

4. The process according to claim 3, wherein, after the reaction medium is placed in contact with said acid and said silicate used in step (vi), an alkaline agent is added to the obtained reaction medium, so as to increase the pH of the reaction medium up to a value of between 4.7 and 6.3.

5. The process according to claim 3, wherein, in said step (ii), the concentrated acid is added after reaching a gel point in the reaction medium.

6. The process according to claim 3, wherein the acid used in at least one of the steps (iv) to (vi) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

7. The process according to claim 3, wherein the acid used in steps (iv) to (vi) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

8. The process according to claim 1, wherein said concentrated acid is sulfuric acid with a concentration of at least 80% by weight.

9. The process according to claim 1, wherein said concentrated acid is sulfuric acid with a concentration of between 90% and 98% by weight.

10. The process according to claim 1, wherein said step (i) comprises adding an acid to water so as to obtain a pH value of between 2 and 5 in the aqueous stock thus formed.

11. The process according to claim 1, wherein said drying is performed by atomization.

* * * * *